Patented Nov. 7, 1944

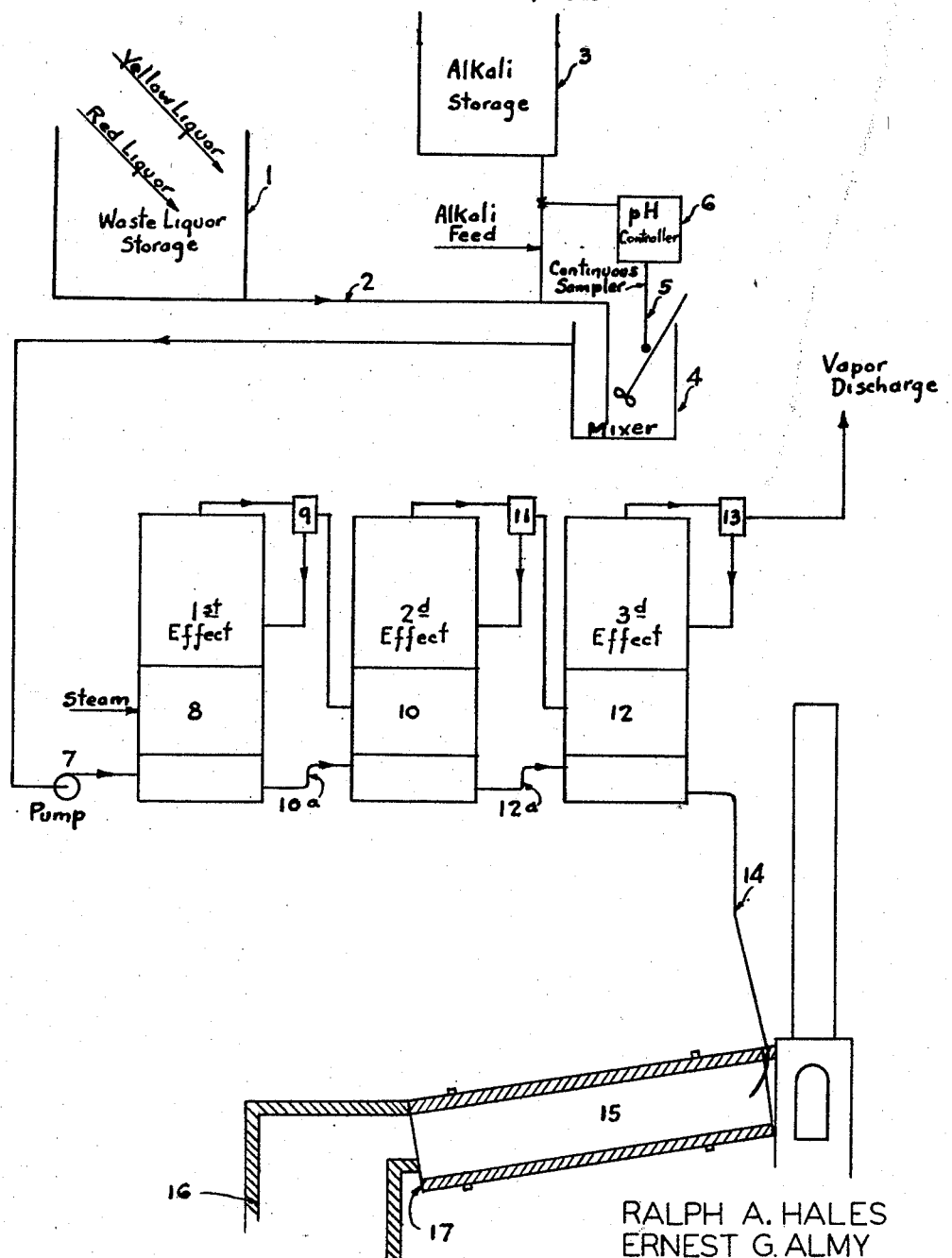

2,362,066

UNITED STATES PATENT OFFICE 2,362,066

PROCESS FOR TREATMENT OF NITROTOLUOL WASTE LIQUORS

Ralph A. Hales, Ernest G. Almy, Aubrey A. Young, and Carl D. Pratt, Tamaqua, Pa., assignors to Atlas Powder Company, Wilmington, Del., a corporation of Delaware Application November 7, 1940, Serial No. 364,682

9 Claims. (Cl. 110—7)

This invention relates to the treatment of certain waste liquors resulting from the manufacture and purification of nitrotoluenes and is more particularly directed to the treatment and/or disposal of waste wash liquors and waste purification liquors resulting from the manufacture of trinitrotoluene.

In the manufacture and subsequent purification of symmetrical trinitrotoluene, for example, large quantities of toxic waste liquors are produced. These waste liquors are generally known as "yellow water" and "red water." The yellow waste liquor is the result of washing the molten T. N. T. with hot water immediately after it is separated from its waste acid. This yellow liquor is acid to the extent of about 1% to about 3%, calculated as $H_2SO_4$, and has an average pH value in the neighborhood of 1. It contains a small percentage of T. N. T. together with small amounts of side reaction products such as nitrobenzoic acids, nitrocresols, tetranitromethane, etc. The red waster liquor results from washing the T. N. T. with sodium sulfite solution. The sulfite reacts with the unsymmetrical isomers of T. N. T. forming dinitrotoluene sodium sulfonates, which are very soluble in water and are not precipitated or extracted by any simple, cheap method. The red waste liquor has a pH value averaging around 9.

Where referred to in this specification and appended claims, the term "aqueous waste liquor obtained in the manufacture of nitrotoluene" means the yellow and/or red water described above.

As far as we are aware, the only method heretofore utilized for the ultimate disposal of these toxic red and yellow waste liquors consists of directly discharging them into a cavity in the earth or into a body of water. This is quite objectionable, however, since the water soluble, organic, toxic compounds in these waste liquors are not easily destroyed by natural means, and, therefore, remain to accumulate for indefinite periods as a source of contamination for lands and waters in the vicinity.

An object of the present invention is, therefore, to provide an effective commercially practical method for the disposal of the waste liquors, resulting from the manufacture and purification of symmetrical T. N. T., whereby the toxic organic constituents thereof will be permanently destroyed.

Another object of the invention is to provide a method for the concentration of such liquors, wherein conditions are so controlled that non-corrosive still-liquors and distillates are produced.

Still another object of the invention is to provide a practicable continuous method for the destruction of the concentrated waste liquors by incineration.

Many other objects and advantages of this invention will become apparent from a consideration of the following detailed description of the invention.

The accompanying drawing is a schematic representation of a preferred process embodying the present invention.

In accordance with the present invention the waste liquor is concentrated by evaporation and the resulting concentrate incinerated, as also hereinafter more thoroughly described.

While the present invention is applicable to the individual treatment and/or disposal of the red and yellow liquors, obtained in the manufacture of nitrotoluenes, we prefer to dispose of them in mixed form, in order to not only utilize the alkalinity of the red liquor to at least partially neutralize the acidity of the yellow liquor, but also to handle and dispose of both liquors simultaneously through the same equipment.

The manufacture of T. N. T. generally results in the production of about three parts of red liquor for each part of yellow liquor produced. By mixing these liquors in approximately that ratio, there is obtained a waste liquor mixture having a pH of about 1 to 3, which is, of course, too corrosive for handling in ordinary steel equipment. We have found, however, that mere neutralization of these mixed waste liquors is not sufficient to prevent the development of acid conditions in the evaporator system. The waste liquors contain unstable reaction products and when they are merely neutralized and an attempt is made to concentrate them, not only does the liquor become acid but also there develop undesirable acid vapors and condensates, at least locally in the system. Furthermore, we have found that these acid vapors and condensates are not always avoided, even though the concentrates are maintained in essentially neutral conditions. This is probably the result of the decomposition of nitro-compounds present and we have found time and temperature of evaporation to also have an important bearing on the situation. However, we have found that the vapors are not unduly corrosive, when the above-mentioned factors of alkalinity, temperature of the concentrating liquor and time are adjusted so that the condensed vapors will have a pH of at least 6.0.

Now in accordance with the present invention we maintain a hydrogen ion concentration of the liquor and/or concentrate which effectively avoids the development of objectionable acid conditions throughout the entire period of evaporation; the actual pH selected depending upon the characteristics and operating conditions of the evaporating system employed, as described more fully below. We have found that under most of the practical operating conditions encountered, the pH of the liquors and/or concentrate should be maintained at a value of at least 7.0 but it will be understood that the desired hydrogen ion concentration is susceptible to considerable variation depending upon the operating conditions.

Operating conditions which we have found to affect the amount of excess alkali required, to avoid objectionable acidity, as described above, include the following: (1) evaporating temperature, (2) concentration of the liquor, (3) time of exposure to high temperatures as influenced, for example, by speed of evaporation and method of feed through the apparatus. We have found the evaporating temperature to be important, particularly at the higher concentrations, to the extent that appreciably less alkali may be employed in the concentrating liquor, without objectionable acidity development, where lower temperatures are maintained, as by the use of a reduced pressure in the system. By way of example, we indicate in the following table the maximum hydrogen ion concentration of the liquor and/or concentrate which should generally be utilized with various evaporating temperatures at the higher concentrations (in the range of about 40 to 60% total solids) in order to provide a distillate having a pH of no less than 6.0:

Table

| Max. evap. temp. | Corresponding minimum pH to be maintained |
| --- | --- |
| 75° C | 7.2 |
| 105° C | 8.0 |
| 107° C | 9.0 |

In the table the evaporation at 75° C. was conducted under vacuum of 20″ of mercury below atmospheric pressure.

As for the lower concentrations, as for example, below 20% total solids, we find that considerably higher evaporating temperatures (as high as about 140° C.) may be employed without producing appreciably acid vapors. Also, we have found that there is an increased tendency toward the development of acidity as the time of exposure at a given high temperature is increased. Because of this, we find it desirable to provide a high rate of evaporation in the evaporator and/or a continuous rather than an intermittent throughput, whereby the required amount of added alkali may be appreciably reduced.

These desirable conditions for evaporation, as set forth above, may be obtained in, for example, a multiple-effect evaporator, such as, for example, that illustrated in the accompanying drawing. In such a system, we may provide a relatively high speed and efficient evaporation, while continuously feeding dilute liquor into and through the first-effect and thence through the several successive effects, wherein it becomes gradually more concentrated until it continuously emerges from the last effect. We may employ steam, under considerable pressure, for heating and evaporating the dilute liquor in the first effect of such a system and successively lower steam and vapor pressures in the other effects, with correspondingly lower evaporating temperatures as the liquor concentration increases, until the vapor and concentrate are discharged from the final effect at essentially atmospheric pressure. Furthermore, in such a system and under such conditions, we have found, for example, that by maintaining the concentrating liquors at a pH of at least 8, by means of caustic soda as the alkalizing agent, throughout their concentration to as much as 60% total solids, we effectively avoid objectionable acidity development. Such controlled conditions in such a system enable the use of ordinary steel equipment for the evaporation of the liquor, and provide an essentially non-corrosive concentrate as well as non-corrosive water vapors which may be condensed and recovered for possible re-use, if desired.

The invention is not limited to the use of a multiple-effect evaporator, however, nor to any particular pressure situation therein, but we may employ any other suitable practical type of evaporating system for our purpose, such as, for example, open-pan types, vacuum-pan types, pressure-boiler types, etc., wherein the pressure conditions, the pH of the liquors and the rate of evaporation are regulated in accordance with the present invention, preferably so that the pH of the condensed distillate is at least 6.0.

In order to create and maintain the power pH of the waste liquors, we prefer to employ caustic soda as the alkalizing agent although other alkalizing agents, such as, for example, caustic potash, lime, sodium carbonate, ammonia, etc., may be employed. These alkalizing agents may be used singly or in combination. For example, while sodium carbonate may be employed to bring the pH up to approximately 6.0, with fair success, excessively large quantities of sodium carbonate must be added if the pH of the waste liquor is to be raised to 8.0 with this alkalizing agent. The use of sodium carbonate, moreover, results in objectionable foaming in the evaporator because the reacting substances liberate carbon dioxide. Similarly, lime is less practical than caustic soda, as the principal alkalizing agent, for although less lime need be employed than sodium carbonate, the quantity of lime required results in excessive scale formation in the evaporator. This scale is extremely objectionable because it is exceedingly hard and tough and requires considerable time and expense for its removal. The use of ammonia, as the principal alkalizing agent, is also objectionable for the reason that it results in a formation of salts which decompose during evaporation, tending to yield acid concentrates.

Caustic soda, by contrast, is a strong alkalizing agent for the mixed liquors, which produces essentially no foaming or scale when used for carrying out the present invention. Accordingly, we prefer to employ caustic soda, or caustic soda in conjunction with another alkalizing agent; the said other alkalizing agent being present in an amount not greater than that required to merely neutralize the waste liquor mixture.

In concentrating the alkalized liquor, it is usually desirable to produce a concentrate that has at least about 30% total solids, so as to avoid excessive water therein, particularly if it is later to be disposed of by incineration. On the other hand, considerable difficulty with excessive sludge formation is sometimes encountered at concentrations as high as about 60% total solids and care should be exercised that the concentrate does not become dry in the evaporator since the residue contains inflammable and unstable compounds. Preferably, the evaporation is conducted until the concentrate contains total solids in the range of about 35% to 45%, in order to make for greater convenience and efficiency in subsequent disposal, as by incineration, shipment in tank-cars, etc.

When this concentric is disposed of by incineration it is discharged into an incinerator, where it is further dehydrated and the residue burned. We have found that this residue, containing the nitro bodies, can be burned while still somewhat moist. Preferably, we employ an incinerator so constructed and arranged that the concentrate progresses through it, the water being gradually evaporated until the concentrate reaches a condition where it will burn. This constitutes a safety feature in that the residue is moist when burned and therefore burns quite sluggishly, whereas it might flash vigorously if dry. The toxic nitro bodies are entirely destroyed by this incineration thereby eliminating them as a source of contamination and leaving an essentially inorganic ash.

In the disposal process of the present invention, the hydrogen ion concentration of the liquor and/or concentrate can be controlled by adding alkalizing agent to the evaporating liquor from time to time or, where continuous evaporation is employed, by adding alkalizing agent at various points in the continuous system. Preferably, however, we add sufficient alkalizing agent initially to provide an excess in the early stages of the evaporation; this excess or reserve being utilized during the later stages so that the concentrate at the exit of the evaporator has a sufficiently low hydrogen ion concentration to effectively avoid the development of objectionable acid conditions.

Thus, for example, where it is desired to maintain the pH of the liquor and/or concentrate at a value of at least 8.0 and the pH of the condensed distillate at a value of at least 6.0, we have found that by raising the pH of the waste liquor mixture to 10.0 prior to evaporation, no further alkalizing agent need be added during the evaporation period.

Where conditions are such that it is desired to maintain the pH of the liquor and/or concentrate at a value of at least 7.2, we have found that after initial alkalization of the liquor to a pH of at least 9.0, additional alkali is not required during the evaporation.

Referring more particularly to the drawing, a non-limiting example of a suitable system for carrying out our invention is shown. Reference number 1 indicates a waste liquor storage tank into which the red and yellow liquors to be treated are charged and mixed. The red liquor introduced into the waste liquor storage tank normally has a pH ranging from about 8 to 10 while the yellow liquor normally has a pH ranging from about 0.5 to 1.5. The normal pH range for the combined waste liquor, in the absence of the alkalizing agent, would be from about 1 to about 3. Numeral 3 indicates an alkali storage tank from which the alkalizing agent is introduced into the line or pipe 2 from which the liquor passes into the mixer 4. A means 5 for continuously sampling the waste liquor in the mixer is provided and operates through the pH controller 6 which in turn effectively controls the amount of alkali introduced into the line or pipe 2. By means of the controlled addition of alkalizing agent, as for example caustic soda solution, the mixed liquors leaving the mixer are alkalized to a pH of preferably about 10 and are pumped by means of pump 7 into the first effect 8 of a multiple effect evaporator system. Steam is admitted into the steam chest of the first effect to evaporate a portion of the water from the caustic treated liquor, the temperature of which is maintained preferably at not over 140° C. The liquor subsequently passes into the second effect 10 by means of the pipe 10a while the vapor from the first effect passes through the entrainment separator 9 into the steam chest of the second effect. After further concentration, the liquor passes by means of pipe 12a into the third effect designated by numeral 12 while the vapor from the second effect passes through the entrainment separator 11 into the steam chest of the third effect. It is to be understood that as many effects as desired may be employed in the evaporator system for the desired concentration of the caustic treated liquor. The vapor from the final (and here third) effect has a pH of at least 6.0 and passes through entrainment separator 13 to the atmosphere at essentially atmospheric pressure. The concentrate in the final effect, at a temperature of approximately 104° to 107° C., has a pH of preferably at least 8 and a solids content varying from about 30 to 60% and is conducted therefrom into the incinerator by means of pipe 14.

The incinerator may be of the rotary type, heated by suitable means such as coal, fuel oil, or gas in the furnace 16. The wet concentrate is fed into the elongated chamber 15 at the end opposite the fire and travels toward the fire, preferably burning in the portion of the chamber 15 near the exit lip 17. It is thus exposed to the flame as it becomes more concentrated and, when it becomes dry enough, it will ignite and burn, thereby destroying the nitro bodies and reducing the concentrate to essentially inorganic ash. In this way there is no accumulation of dry inflammable residue, since the material containing several percent water will ignite and continue to burn. Under this condition, it burns sluggishly with a voluminous ash. If allowed to become completely dry before ignition, the residue burns more vigorously and may show some tendency toward flashing, particularly if the ignition temperature is reached without exposure to flame, in which case the flash may approach violence. An accumulation of dry residue should therefore be treated as somewhat of a hazard and the operation should be controlled so as to prevent this condition.

However, tests have failed to show the dry unignited residue to be sensitive to detonation. Impact tests made on dry residues by dropping a 10 lb. weight from a height of about 9 ft. onto the sample, held between two hardened steel anvils, failed in every case to cause any explosion of the material. Additional attempts to explode the dry residues by means of No. 8 blasting caps also failed.

Without in any way limiting the invention, the following is exemplary of the quantity of certain alkalizing agents required to alkalize T. N. T. waste liquors although these amounts may be expected to vary somewhat:

(1) A waste liquor mixture consisting of one part by weight yellow liquor and three parts by weight red liquor required 42 lbs. of caustic soda per thousand gallons of the mixture to raise the pH to 10.0.

(2) A similar waste liquor mixture required 67 lbs. of sodium carbonate per thousand gallons of the liquor mixture to raise the pH to 6.7 and thereafter .9 lbs. of caustic soda per thousand gallons of the liquor mixture to raise the pH to 10.0.

It will be readily understood that the quantity of alkalizing agent employed will depend upon the acidity of the waste liquor and the strength of the particular alkalizing agent, as well as the minimum pH selected to be maintained during evaporation.

We may further modify the alkalizing treatment by heating the mixed waste liquors to drive off volatile acids before addition of any alkalizing agent or we may partially neutralize with sodium carbonate and then heat the mixture to drive off carbon dioxide; thus reducing the amount of caustic soda necessary to adjust the pH to the desired value.

Having fully described our invention, what we claim is as follows:

1. A process for the disposal of aqueous waste liquor obtained in the manufacture of nitrotoluene which comprises evaporating a major portion of the water from the said waste liquor while maintaining the hydrogen ion concentration of said liquor sufficiently low by means of added caustic alkali that a pH greater than 7 is maintained under the conditions of evaporating rate and temperature employed, and that the pH of condensate from the evaporating liquor is maintained at a value of at least 6, and continuing said evaporating until a residue containing at least 30% total solids is obtained.

2. A process for the disposal of aqueous waste liquor obtained in the manufacture of nitrotoluene which comprises evaporating a major portion of the water from the said waste liquor while maintaining the hydrogen ion concentration of said liquor sufficiently low by means of added caustic alkali that a pH greater than 7 is maintained under the conditions of evaporating rate and temperature employed, and that the pH of condensate from the evaporating liquor is maintained at a value of at least 6, continuing said evaporating until the residue obtained contains at least 30% total solids, but a water content such that it is unignitable, and incinerating said residue by passing said residue gradually through a zone to which heat is supplied from an outside source and in which said residue is further dried and is ignited, the temperature of said zone being maintained such that the said residue is ignited as soon as it becomes ignitable and while still moist whereby burning of a dry residue with explosive violence is avoided.

3. A process according to claim 1 in which the pH of the evaporating liquor is maintained at a value of at least 8.

4. A process according to claim 1 in which the caustic alkali is caustic soda.

5. A process according to claim 2 in which the pH of the evaporating liquor is maintained at a value of at least 8 and the caustic alkali is caustic soda.

6. A process according to claim 2 in which the evaporation is conducted under multiple effect evaporating conditions in which the evaporation temperatures become progressively lower in successive effects and in which the evaporation temperature of the liquor in the first effect is maintained below about 140° C. and the evaporation temperature of the liquor in the final effect is maintained below about 105° C.

7. A process according to claim 2 in which the waste liquors evaporated are those resulting from the mixing of "red" and "yellow" liquors obtained in the manufacture of trinitrotoluene.

8. A process according to claim 1 in which the evaporation is conducted under multiple effect evaporating conditions in which the evaporation temperatures become progressively lower in successive effects and in which the evaporation temperature of the liquor in the first effect is maintained below about 140° C. and the evaporation temperature of the liquor in the final effect is maintained below about 105° C.

9. A process according to claim 1 in which the waste liquors evaporated are those resulting from the mixing of "red" and "yellow" liquors obtained in the manufacture of trinitrotoluene.

RALPH A. HALES.
ERNEST G. ALMY.
AUBREY A. YOUNG.
CARL D. PRATT.

CERTIFICATE OF CORRECTION.

Patent No. 2,362,066.  November 7, 1944.

RALPH A. HALES, ET AL.

It is hereby certified that error appears in the printed specification of the above numbered patent requiring correction as follows: Page 1, first column, line 15, after the word "yellow" insert --waste--; page 2, second column, line 31, for "power" read --proper--; page 3, first column, line 10, for "concentric" read --concentrate--; and that the said Letters Patent should be read with this correction therein that the same may conform to the record of the case in the Patent Office.

Signed and sealed this 30th day of January, A. D. 1945.

Leslie Frazer (Seal)  Acting Commissioner of Patents.